US008088614B2

(12) United States Patent
Vick et al.

(10) Patent No.: US 8,088,614 B2
(45) Date of Patent: Jan. 3, 2012

(54) METHODS AND COMPOSITIONS FOR PRODUCTION AND PURIFICATION OF BIOFUEL FROM PLANTS AND MICROALGAE

(75) Inventors: Bertrand Vick, Berkeley, CA (US); Matthew Caspari, San Francisco, CA (US); Guido Radaelli, Berkeley, CA (US)

(73) Assignee: Aurora Algae, Inc., Hayward, CA (US)

( * ) Notice: Subject to any disclaimer, the term of this patent is extended or adjusted under 35 U.S.C. 154(b) by 731 days.

(21) Appl. No.: 11/985,183

(22) Filed: Nov. 13, 2007

(65) Prior Publication Data
US 2008/0155888 A1 Jul. 3, 2008

Related U.S. Application Data

(60) Provisional application No. 60/858,807, filed on Nov. 13, 2006.

(51) Int. Cl.
*C11C 1/00* (2006.01)
(52) U.S. Cl. ............ 435/271; 554/21; 44/308; 977/894; 585/833; 540/145
(58) Field of Classification Search .................. 435/271; 44/308; 977/894; 585/833; 554/21; 540/145
See application file for complete search history.

(56) References Cited

U.S. PATENT DOCUMENTS

| 1,926,780 | A |   | 9/1933  | Lippincott     |
|-----------|---|---|---------|----------------|
| 3,468,057 | A |   | 9/1969  | Buisson        |
| 3,897,000 | A |   | 7/1975  | Mandt          |
| 3,962,466 | A |   | 6/1976  | Nakabayashi    |
| 4,003,337 | A |   | 1/1977  | Moore          |
| 4,267,038 | A |   | 5/1981  | Thompson       |
| 4,365,938 | A |   | 12/1982 | Warinner       |
| 4,535,060 | A | * | 8/1985  | Comai          |
| 4,658,757 | A |   | 4/1987  | Cook           |
| 5,105,085 | A |   | 4/1992  | McGuire et al. |
| 5,130,242 | A |   | 7/1992  | Barclay        |
| 5,244,921 | A |   | 9/1993  | Kyle           |
| 5,338,673 | A |   | 8/1994  | Thepenier et al. |

(Continued)

FOREIGN PATENT DOCUMENTS

WO 2004106238 A2 12/2004

(Continued)

OTHER PUBLICATIONS

Kizililsoley, Mustafa et al., Micro-Algae Growth Technology Systems, Presented by Selim Helvacioglu, Soley Institute 2008.

(Continued)

*Primary Examiner* — Deborah D Carr
(74) *Attorney, Agent, or Firm* — Carr & Ferrell LLP

(57) ABSTRACT

Methods and compositions are provided for producing purified oil from an organism, whether these organisms are wild type, selectively bred or genetically modified, and are suitable for the large scale production of an oil product. The organism may be an animal, a plant or a microorganism such as yeast, bacteria or algae. The organism is processed to create a biomass which can be extracted to remove the lipids contained within the biomass. The extraction produces a crude extract rich in lipids and containing residual contaminants. These contaminants are removed by contacting the crude extract with a composition that comprises a nanomaterial. Subsequently an oil product is recovered which is substantially free from residual contaminants, such as pigments.

28 Claims, 9 Drawing Sheets

U.S. PATENT DOCUMENTS

| | | | |
|---|---|---|---|
| 5,478,208 | A | 12/1995 | Kasai et al. |
| 5,527,456 | A | 6/1996 | Jensen |
| 5,539,133 | A | 7/1996 | Kohn et al. |
| 5,567,732 | A | 10/1996 | Kyle |
| 5,658,767 | A | 8/1997 | Kyle |
| 6,117,313 | A | 9/2000 | Goldman |
| 6,166,231 | A | 12/2000 | Hoeksema |
| 6,372,460 | B1 | 4/2002 | Gladue et al. |
| 6,524,486 | B2 | 2/2003 | Borodyanski |
| 6,579,714 | B1 | 6/2003 | Hirabayashi et al. |
| 6,736,572 | B2 | 5/2004 | Geraghty |
| 6,750,048 | B2 | 6/2004 | Ruecker et al. |
| 6,831,040 | B1 | 12/2004 | Unkefer et al. |
| 7,381,326 | B2 | 6/2008 | Haddas |
| 2003/0199490 | A1 | 10/2003 | Antoni-Zimmermann et al. |
| 2004/0121447 | A1 | 6/2004 | Fournier |
| 2004/0161364 | A1 | 8/2004 | Carlson |
| 2004/0262219 | A1 | 12/2004 | Jensen |
| 2004/0562219 | | 12/2004 | Jensen |
| 2005/0064577 | A1 | 3/2005 | Berzin |
| 2005/0164192 | A1 | 7/2005 | Graham et al. |
| 2005/0170479 | A1 | 8/2005 | Weaver |
| 2005/0260553 | A1 | 11/2005 | Berzin |
| 2005/0273885 | A1 | 12/2005 | Singh et al. |
| 2006/0045750 | A1 | 3/2006 | Stiles |
| 2006/0122410 | A1 | 6/2006 | Fichtali et al. |
| 2006/0166243 | A1 | 7/2006 | Hankamer et al. |
| 2006/0166343 | A1 | 7/2006 | Hankamer et al. |
| 2008/0118964 | A1 | 5/2008 | Huntley et al. |
| 2008/0120749 | A1 | 5/2008 | Melis et al. |
| 2008/0155888 | A1 | 7/2008 | Vick et al. |
| 2008/0160591 | A1 | 7/2008 | Willson et al. |
| 2008/0160593 | A1 | 7/2008 | Oyler |
| 2008/0293132 | A1 | 11/2008 | Goldman et al. |
| 2009/0011492 | A1 | 1/2009 | Berzin |
| 2009/0029445 | A1 | 1/2009 | Eckelberry |
| 2009/0081748 | A1 | 3/2009 | Oyler |
| 2009/0148931 | A1 | 6/2009 | Wilkerson et al. |
| 2009/0151241 | A1 | 6/2009 | Dressler et al. |
| 2009/0162919 | A1 | 6/2009 | Radaelli et al. |
| 2009/0234146 | A1 | 9/2009 | Cooney et al. |
| 2009/0325270 | A1 | 12/2009 | Vick et al. |
| 2010/0022393 | A1 | 1/2010 | Vick et al. |
| 2010/0068772 | A1 | 3/2010 | Downey |
| 2010/0151540 | A1 | 6/2010 | Gordon et al. |
| 2010/0183744 | A1 | 7/2010 | Weissman et al. |
| 2010/0196995 | A1 | 8/2010 | Weissman et al. |
| 2010/0210003 | A1 | 8/2010 | King |
| 2010/0260618 | A1 | 10/2010 | Parsheh et al. |
| 2010/0261922 | A1 | 10/2010 | Fleischer et al. |
| 2010/0314324 | A1 | 12/2010 | Rice et al. |
| 2010/0317088 | A1 | 12/2010 | Radaelli et al. |
| 2010/0325948 | A1 | 12/2010 | Parsheh et al. |
| 2010/0327077 | A1 | 12/2010 | Parsheh et al. |
| 2010/0330643 | A1 | 12/2010 | Kilian et al. |
| 2010/0330658 | A1 | 12/2010 | Fleischer et al. |
| 2011/0041386 | A1 | 2/2011 | Fleischer et al. |
| 2011/0072713 | A1 | 3/2011 | Fleischer et al. |
| 2011/0136212 | A1 | 6/2011 | Parsheh et al. |

FOREIGN PATENT DOCUMENTS

| | | |
|---|---|---|
| WO | WO 2009/037683 A1 | 3/2009 |

OTHER PUBLICATIONS

Ben-Amotz, Ami, Large Scale Open Ponds, Presented at the NREL-AFOSR Joint Workshop on Algal Oil for Jet Fuel Production in Feb. 2008.

Janssen et al., "Enclosed outdoor photobioreactors: light regime, photosynthetic efficiency, scale-up, and future prospects," Biotechnology and Bioengineering, vol. 81, No. 2, p. 193-210, Jan. 20, 2003, Entire document, especially: Fig 4, p. 198 [online]. Retrieved from the Internet on [Oct. 5, 2010]. Retrieved from: <URL: http://onlinelibrary.wiley.com/doi/10.1002/bit.10468/pdf.

Strzepek et al., "Photosynthetic architecture differs in coastal and oceanic diatoms," Nature vol. 431, p. 689-692, Oct. 7, 2004. Entire document, especially: abstract, p. 689, col. 2; p. 691, Table 1 [online] Retrieved from the Internet on [Oct. 5, 2010]. Retrieved from: <URL: http://www.nature.com/nature/journal/v431/n7009/pdf/nature02954.pdf.

Zitelli et al., "Mass cultivation of *Nannochloropsis* sp. in annular reactors," Journal of Applied Phycology vol. 15, p. 107-113, Mar. 2003, Entire document, especially: abstract; p. 110, col. 1-2 [online]. Retrieved from the Internet on [Oct. 5, 2010]. Retrieved from: <URL: http://www.springerlink.com/content/v77772k1mp081775/fulltext.pdf.

Csogor et al., "Light distribution in a novel photobioreactor—modeling for optimization," Journal of Applied Phycology, vol. 13, p. 325-333, May 2001, Entire document, especially: Fig 2, p. 327; Table 1, p. 327; Fig 7, p. 330 [online]. Retrieved from the Internet on [Oct. 5, 2010]. Retrived from: <URL: http://www.springerlink.com/content/p77j66g3j2133522/fulltext.pdf.

Kureshy, et al. "Effect of Ozone Treatment on Cultures of *Nannochloropsis oculata, Isochrysis galbana*, and *Chaetoceros gracilis*." Journal of the World Aquaculture Society, Dec. 1999, vol. 30, No. 4, pp. 473-480; p. 473, Abstract; p. 475, "*Nannochloropsis oculata*" Section; p. 476, Table 1; p. 476, Table 2; p. 479, left col., para 2.

NCBI entry EE109892 (Jul. 27, 2006) [Retrieved from the Interenet on Oct. 19, 2009; <http://www.ncbi.nlm.nih.gov/nucest/EE109892?ordinalpos=1&itool=EntrezSystem2.PEntrez.Sequence.Sequence_ResultsPanel. Sequence_RVDocSum>].

Knuckey et al., "Production of Microalgal Concentrates by Flocculation and Their Assessment as Aquaculture Feeds," Aquacultural Engineering 35 (2006) 300-313.

Grima et al., "Recovery of Microalgal Biomass in Metabolites: Process Options and Economics," Biotechnology Advances 20 (2003) 491-515.

Lee et al. Isolation and Characterization of a Xanthophyll Aberrant Mutant of the Green Alga *Nannochloropsis oculata* Marine Biotechnology vol. 8, 238-245 (2006) (p. 239 col. 1 para 1; p. 239 col. 2 para 4; p. 240 col. 1 para 2; p. 242 col. 2 para 2; p. 241 Table 1, Fig 2; p. 242 Table 2).

Berberoglu et al. Radiation characteristics of *Chlamydomonas reinhardtii* CC125 and itstruncated chlorophyll antenna transformants tla1, tlaX and tla1-CW+. International Journal of Hydrogen Energy.2008 vol. 33 pp. 6467-6483, especially the abstract.

Ghirardi et al. Photochemical apparatus organization in the thylakoid membrane of *Hordeum vulgare* wild type and chlorophyll b-less chlorina f2 mutant. Biochimica et Biophysica Acta (BBA)—Bioenergetics. Volume 851, Issue 3, Oct. 8, 1986, pp. 331-339 (abstract only).

Steinitz et al. A mutant of the cyanobacterium *Plectonema boryanum* resistant to photooxidation. Plant Science Letters. vol. 16, Issues 2-3, Oct. 1979, pp. 327-335 (abstract only).

Shikanai et al. Identification and Characterization of Arabidopsis Mutants with Reduced Quenching of Chlorophyll Fluorescence. Plant and Cell Physiology, 1999, vol. 40, No. 11. pp. 1134-1142 (abstract only).

Kureshy et al. "Effect of Ozone Treatment on Cultures of *Nannochloropsis oculata, Isochrysis galbana*, and *Chaetoceros gracilis*." Journal of the World Aquaculture Society, Dec. 1999, vol. 30, No. 4, pp. 473-480; p. 473, Abstract, p. 475, "*Nannochloropsis oculata*" Section; p. 476, Table 1; p. 476, Table 2; p. 479, left column, para 2.

Labatut et al. "Hydrodynamics of a Large-Scale Mixed-Cell Raceway (MCR): Experimental Studies" Aquacultural Engineering vol. 37, Issue 2, Sep. 2007, pp. 132-143, esp: abstract, p. 134, p. 135, p. 136, p. 137, p. 138, p. 142, Figs. 2, 4, 5 Table 2.

Eberling et al. "Design and Operation of a Zero-Exchange Mixed-Cell Raceway Production System" 2nd International Sustainable Marine Fish Culture Conference and Workshop, Oct. 19-21, 2005. Entire document.

Eberling et al. "Mixed-Cell Raceway: Engineering Design Criteria, Construction, and Hydraulic Characterization" North American Journal of Aquaculture 2005; 67: 193-201. Abstract only.

Lee et al. "Isolation and Characterization of a Xanthophyll Aberrant Mutant of the Green Alga *Nannochloropsis oculata*" Marine Biotechnology vol. 8, 238-245 (2006) (p. 239 col. 1 para 1; p. 239 col. 2 para 4; p. 240 col. 1 para 2; p. 242 col. 2 para 2; p. 241 Table 1, Fig 2; p. 242 Table 2).

Berberoglu et al. "Radiation characteristics of *Chlamydomonas reinhardtii* CC125 and its truncated chlorophyll antenna transformants tla1, tlaX, and tla 1-CW-+" International Journal of Hydrogen Energy. 2008 vol. 33 pp. 6467-6483, especially the abstract.

Ghirardi et al. "Photochemical apparatus organization in the thylakoid membrane of *Hordeum vulgare* wild type and chlorophyll b-less chlorina f2 mutant." Biochimica et Biophysica Acta (BBA)—Bioenergetics. vol. 851, Issue 3, Oct. 8, 1986, pp. 331-339 (abstract only).

Steinitz et al. "A mutant of the cyanobacterium *Plectonema boryanum* resistant to photooxidation" Plant Science Letters. vol. 16, Issues 2-3, Oct. 1979, pp. 327-335 (abstract only).

Koller et al. Light Intensity During Leaf Growth Affects Chlorophyll Concentration and CO2 Assimilation of a Soybean Chlorophyll Mutant. Crop Sci. 1974. vol. 14 pp. 779-782 (abstract only).

Shikanai et al. "Identification and Characterization of Arabidopsis Mutants with Reduced Quenching of Chlorophyll Fluorescence." Plant and Cell Physiology, 1999, vol. 40, No. 11. pp. 1134-1142 (abstract only).

Santin-Montanaya I. "Optimal Growth of *Dunaliella primolecta* in axenic conditions to assay herbicides" Chemosphere, 66, Elsevier 2006, pp. 1315-1322.

Felix, R. "Use of the cell wall-less alga *Dunaliella bioculata* in herbicide screening tests" Annals of Applied Biology, 113, 1988, pp. 55-60.

Janssen, M. "Photosynthetic efficiency of *Dunaliella tertiolecta* under short light/dark cycles" Enzyme and Microbial Technology, 29, 2001, pp. 298-305.

Saenz, M.E. "Effects of Technical Grade and a Commercial Formulation of Glyphosate on Algal Population Growth" Bulletin of Environmental Contamination Toxicology, 1997, pp. 638-644.

U.S. Appl. No. 13/098,338, Mehran Parsheh, Optimization of Circulation of Fluid in an Algae Cultivation Pond, filed Apr. 29, 2011.

U.S. Appl. No. 12/704,035, Shaun Bailey, Efficient Light Harvesting, filed Feb. 11, 2010.

U.S. Appl. No. 12/983,767, Daniel Fleischer, Systems and Methods for Extracting Lipids from and Dehydrafting Wet Algal Biomass, filed Jan. 3, 2011.

U.S. Appl. No. 13/075,122, Mehran Parsheh, Systems and Methods for Processing Algae Cultivation Fluid, filed Mar. 29, 2011.

U.S. Appl. No. 13/078,889, Jeffrey G. Hippler, Conversion of Saponifiable Lipids into Fatty Esters, filed Apr. 1, 2011.

\* cited by examiner

GREEN HEXANE DILUTED 1:10 IN PURE HEXANE

TEST SETUP

| MEASUREMENT MODE | ABSORBANCE |
| --- | --- |
| START WAVELENGTH | 200.0NM |
| STOP WAVELENGTH | 1100.0NM |
| INTERVAL | 1.0NM |

CHLOROPHYLL AND CAROTENOID OVERLAID

AFTER 2G CHARCOAL ADDED

TEST SETUP

| | |
|---|---|
| MEASUREMENT MODE | ABSORBANCE |
| START WAVELENGTH | 200.0NM |
| STOP WAVELENGTH | 1100.0NM |
| INTERVAL | 1.0NM |

CHLOROPHYLL AND CAROTENOIDS GOING AWAY

METHODS AND COMPOSITIONS FOR PRODUCTION AND PURIFICATION OF BIOFUEL FROM PLANTS AND MICROALGAE

CROSS REFERENCE

This application claims the benefit of U.S. Provisional Application No. 60/858,807, filed Nov. 13, 2006, which application is incorporated herein by reference.

BACKGROUND OF THE INVENTION

Multi-cellular plants and many microorganisms are able to naturally accumulate a large amount of triglycerides within their cells under certain environmental conditions. For example when exposed to nitrogen starvation, microorganisms such as algae increase their content of triglycerides up to 50-60% of their total dry mass.

Triglycerides form the lipidic energy storage of plant cells and can be extracted from plant biomass to generate an oil product via a solvent extraction or through more complicated processes. Such processes include two-phase extraction of oil from biomass (U.S. Pat. No. 6,166,231, hereby incorporated by reference in entirety) and solventless extraction processes (U.S. Pat. No. 6,750,048, hereby incorporated by reference in entirety). The resulting oil from these processes is a mixture of triglycerides and various lipophillic pigments, such as carotenoids and xanthophylls. The oil can be used as a fuel, either directly if fed to a burner or an engine, or indirectly if converted to biodiesel via transesterification. Vegetable oils, derived from plants like soy, canola, sunflower, marigold and palm, can also used as renewable energy resources, usually upon their conversion into biodiesel via transesterification. Oil produced from microorganisms, such as algae, can be used in addition to or as a replacement of said vegetable oils.

Renewable resources for energy generation are gaining increasing value as world-wide demand for fossil fuels increases while existing sources are diminished by current consumption rates. While vegetable oil from plants can be used in the place of some fossil fuels, oil products derived from microorganisms such as algae have the potential to satisfy a higher portion of the global energy demand. Algae can produce 10 to 250 times higher oil yields per acre per year than terrestrial plants. For example, half the entire landmass of the United States would have to be cultivated in soy to produce enough vegetable oil to replace the current US diesel consumption. In contrast only a fraction of this area would be necessary to cultivate sufficient algae to produce enough oil products to replace current US diesel consumption. Presently the establishment of systems for the large scale production of oil from plants and microorganisms has not been economically viable. The difficulties in enhancing oil accumulation rates in plants and microorganisms, the development of inexpensive growing systems, and the production of substantially pure forms of oil have made oil produced from organisms more expensive than fossil fuels. Historically, the commercial production of fuel oil from microorganisms such as algae has been fraught with problems. One of the major short-comings of previous endeavors to produce oil from microorganisms and plants is the expenses associated with the purification of lipid fractions from contaminants such as plant pigments.

In general, cultivation of microorganisms can be performed in either closed systems (photobioreactors) or open ponds. Closed systems display higher productivities because of their better control of the critical operating parameters and the absence of significant contamination. Open ponds are currently adopted at an industrial scale for the production of several microorganismal-derived products.

The present invention provides a new process for the economically viable production of oil from organisms, including plants and microorganisms such as algae. The process produces a purified oil end product that is free from contaminants such as residual pigments from the initial organism. This process can be used to purify crude extracts from terrestrial plants, aquatic plants and microorganisms such as algae.

SUMMARY OF THE INVENTION

In an aspect, the invention provides a process for recovering an oil product from an organism comprising: (a) obtaining a crude extract from an organismal biomass; (b) applying said crude extract to a composition comprising a nanomaterial; and (c) recovering said oil product from said composition comprising the nanomaterial.

In an embodiment, an organism in the organismal biomass is grown prior to step (a). The organism can be a plant or an alga. In an embodiment wherein the organism is an algae, the algae can be any from the genuses including, but not limited to, *Dunaliella, Chlorella, Nannochloropsis*, or *Spirulina*. The organism can be *Dunaliella Bardawil, Dunaliella salina, Dunaliella primolecta, Chlorella vulgaris, Chlorella emorsonii, Chlorella minutissima, Chlorella sorokiniana, Chlorella vulgaris, Spirulina platensis, Cyclotella cryptica, Tetraselmis suecica, Monoraphidium, Botryococcus braunii, Stichococcus, Haematococcus pluvialis, Phaeodactylum tricomutum, Tetraselmis suecica, Isochrysis galbana, Nannochloropsis, Nitzschia closterium, Phaeodactylum tricomutum, Chlamydomas perigranulata, Synechocystisf, Tagetes erecta* or *Tagetes patula*.

In an embodiment of the invention, crude extract is obtained in step (a) by exposing the organismal biomass to at least one water-immiscible solvent. The water-immiscible solvent can be selected from the group consisting of carbon tetrachloride, chloroform, cyclohexane, 1,2-dichloroethane, dichloromethane, diethyl ether, dimethyl formamide, ethyl acetate, heptane, hexane, methyl-tert-butyl ether, pentane, toluene, 2,2,4-trimethylpentane.

In an embodiment, the nanomaterial is a carbonaceous nanomaterial. In another embodiment, the composition comprises at least 10% by weight of carbonaceous nanomaterials. In a preferable embodiment, the nanomaterial comprises carbonaceous nanoparticles, wherein the smallest dimension of said carbonaceous nano particles is less than 500 nm. At least 50% of the nanoparticles can be a material other than a carbon nanotube. In a different embodiment, a portion of the carbonaceous material can have a tubular or spheroid configuration.

At least 50% of said carbonaceous particles can have a smallest dimension less than 500 nm, 300 nm, 200 nm, or 100 nm.

The nanomaterial can have the capacity to bind an amount of contaminant equal to at least 50% of the weight of said nanomaterial. In an embodiment, the nanomaterial has the capacity to bind an amount of contaminant equal to at least 10 times the weight of said nanomaterial.

In a preferable embodiment, the nanomaterial comprises graphene. The nanomaterial can comprise at least 10%, 30%, 50%, 70%, 90%, or 99.9% graphene by weight.

In an embodiment, the recovery step (c) comprises applying pressure to said composition in order to recover said oil product. The applying pressure can be centrifugation or mechanical compression in order to obtain said oil product.

In another embodiment, the process of the invention further comprises step (d) wherein the oil product produced in step (c) is exposed to a treatment to remove the at least one solvent. The treatment can comprise evaporation at a low temperature. The invention provides a composition produced by a process comprising step (d), wherein the composition is purified oil that is substantially free of any solvents or pigments. The composition can have less than 15% water by weight. In an embodiment, the organism from which the purified oil was produced is a plant or an alga.

In an aspect of the invention, a process for recovering triglycerides, comprises: (a) obtaining a crude extract from an organismal biomass; (b) applying said crude extract to a composition comprising a nanomaterial; and (c) recovering said triglycerides from said composition comprising the nanomaterial. The process can further comprise the step of transesterification of the triglycerides into a fuel selected from the group of biodiesel or biogasoline.

In another aspect, the invention provides a process for recovering an organic pigment comprising: (a) obtaining a crude extract from an organismal biomass; (b) applying said crude extract to a composition comprising a nanomaterial; and
(c) recovering said organic pigment from said composition comprising a nanomaterial. The purified organic pigment can be selected from the group of b-carotene, astaxanthin, zeaxanthin, a carotenoid or a chlorophyll. In a preferable embodiment, the purified organic pigment is a chlorophyll.

In yet another aspect of the invention, a process for producing a biofuel comprises: (a) obtaining a crude extract from an organismal biomass; (b) applying said crude extract to a composition comprising a nanomaterial; (c) recovering said oil product from said composition comprising a nanomaterial; and (d) converting the purified oil product by transesterification into biodiesel or biogasoline.

In an aspect, the invention provides a process for recovering an oil product from a plant, comprising: (a) obtaining a crude extract from a plant biomass; (b) applying said crude extract to a composition comprising a nanomaterial; and (c) recovering said oil product from said composition comprising a nanomaterial, wherein said oil product is substantially free of any plant pigments.

In an aspect, the invention discloses a composition comprising an extract of an organism and a nanomaterial. The nanomaterial can be a carbonaceous nanomaterial. In a preferable embodiment, a carbonaceous nanomaterial comprises graphene. The carbonaceous nanomaterial can comprise at least 10%, 30%, 50%, 70%, 90%, or 99.9% graphene by weight.

In another aspect, a process for recovering a lipid-containing oil product from an organism, comprising:
(a) admixing an organismal biomass with a water-immiscible solvent to produce a crude extract of the biomass which contains lipid and the water-immiscible solvent;
(b) adding a nanomaterial to the crude extract wherein the nanomaterial absorbs the lipid, the water-immiscible solvent and at least one organic pigment;
(c) isolating the nanomaterial in step (b) from the rest of the crude extract; and
(d) recovering a lipid-containing oil product from the isolated nanomaterial in step (c), wherein the lipid-containing oil product is substantially free of chlorophyll.

The water-immiscible solvent may be selected from the group consisting of carbon tetrachloride, chloroform, cyclohexane, 1,2-dichloroethane, dichloromethane, diethyl ether, dimethyl formamide, ethyl acetate, heptane, hexane, methyl-tert-butyl ether, pentane, toluene, 2,2,4-trimethylpentane.

According to the present invention, the lipid-containing oil product preferably contains less than 10%, more preferably less than 5% of the chlorophyll in the crude extract.

The process may further comprise:
(e) adding activated charcoal to the lipid-containing oil product in step (d); and
(f) isolating a further purified lipid-containing oil product by removing the activated charcoal in step (e).

The further purified lipid-containing oil product in step (f) is preferably substantially free of carotenoid; e.g., containing less than 20% of the carotenoid in the lipid-containing oil product in step (d).

In another aspect, the invention provides a process for recovering a carotenoid, comprising: (a) obtaining a crude extract containing a plurality of organic pigments from an organismal biomass; (b) applying said crude extract containing a plurality of organic pigments to a composition comprising a nanomaterial, wherein the composition comprising a nanomaterial selectively removes at least one organic pigment that is not a carotenoid from said crude extract; (c) recovering said crude extract from step (b); and (d) recovering a carotenoid from said crude extract from step (c). In an embodiment, the at least one organic pigment that is not a carotenoid is a chlorophyll and the process can further comprising recovering the chlorophyll from the composition comprising a nanomaterial.

In an embodiment, the nanomaterial is graphene. In another embodiment, the carotenoid is recovered by an extraction method. In yet another embodiment, the process further comprises recovering an oil product from said crude extract.

INCORPORATION BY REFERENCE

All publications and patent applications mentioned in this specification are herein incorporated by reference to the same extent as if each individual publication or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION OF THE INVENTION

Figure 1A:
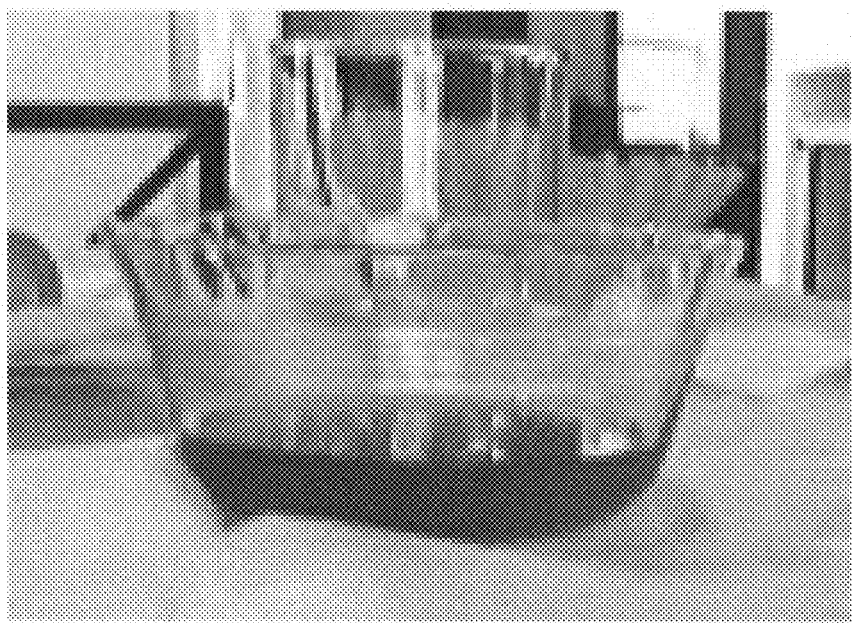
FIG. 1 shows a process of isolation of lipids from an algae biomass/hexane mixture: A) an algae biomass/hexane mixture; B) algae biomass/hexane mixture with the addition of graphene; C) the graphene that adsorbed the algae biomass/hexane mixture, after addition; D) filtration of the graphene; E) the purified oil product, which is optically clear and substantially free of contaminating pigments.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

The present invention provides processes and compositions for the production of purified oil from organisms, including animals, multi-cellular plants and microorganisms such as algae and yeast. It will be appreciated by one of skill in the art that any organism which produces readily extractable lipids can be used in the present invention. In one embodiment, a method is provided for recovering an oil product comprising obtaining a crude extract from an organism and combining it with a composition comprising a nanomaterial. This produces a composition comprising a nanomaterial and the crude extract. This composition is then optionally subjected to pressure so that an oil product, substantially free from contaminants is recovered. The end product may be further purified in order to remove any solvents. Thus producing a purified oil which is substantially free of contaminants present in the crude extract, such as residual pigments. The purified oil is rich in lipids, such as triglycerides, and can be used as a food oil, lubricant, burned directly, or subjected to processing to convert it into a fuel, such as bio-diesel or bio-gasoline. The purified oil can also be rich in omega-3 unsaturated fatty acids, usually produced and sold as nutraceuticals or food additives. Thus, the method may further comprise producing triglycerides, bio-diesel, bio-gasoline, or omega-3 unsaturated fatty acids.

The oil product consists primarily of a solvent/lipid phase. The solvent can be removed from the oil product using any conventional method known in the art, such as by evaporation using low temperature heating. The resultant purified oil is substantially free of solvent and contaminants, such as plant pigments. The purified oil is suitable for transesterfication for use as bio-diesel or bio-gasoline.

In another embodiment, a process is provided for producing plant pigments comprising extracting from the composition comprising a nanomaterial after it has been combined with the crude extract. These plant pigments include β-carotene, astaxanthin, zeaxanthin, any other molecule classified as carotenoid or chlorophyll, or any other pigment produced by plants.

In an embodiment, the contact of nanomaterial and crude extract can selectively produce a composition containing only part of the contaminants. In this case, a process of the invention can be used for separating different residual pigments in a biomass. For example, a nanomaterial comprising graphene may selectively remove chlorophyll from an organismal biomass that also contains carotenoids. The carotenoids that have been removed can be useful commercially.

In another aspect, the invention provides a process for recovering a carotenoid, comprising: (a) obtaining a crude extract containing a plurality of organic pigments from an organismal biomass; (b) applying said crude extract containing a plurality of organic pigments to a composition comprising a nanomaterial, wherein the composition comprising a nanomaterial selectively removes at least one organic pigment that is not a carotenoid from said crude extract; (c) recovering said crude extract; and (d) recovering a carotenoid from said crude extract. In an embodiment, the at least one organic pigment that is not a carotenoid is a chlorophyll and the process can further comprising recovering the chlorophyll from the composition comprising a nanomaterial.

In an embodiment, the nanomaterial is graphene. In another embodiment, the carotenoid is recovered by an extraction method. In yet another embodiment, the process further comprises recovering an oil product from said crude extract.

The present invention provides processes and compositions for separating a crude extract containing lipids from biological material. The present invention is particularly suitable for extraction of triglycerides for ultimate use as fuel oils, which can be burned directly, or processed further to make fuels such as bio-diesel or bio-gasoline. In a particular embodiment, the invention relates to a process whereby a crude extract is extracted from an organismal biomass containing microorganismal material that originated from a culturing or fermentation process. This embodiment typically involves concentrating an aqueous suspension of microorganismal cells, optionally drying and/or disrupting the cells, and then extracting the resultant biomass by contacting the biomass with a solvent appropriate for the production of a crude extract from the biomass slurry. Wherein, any solvent miscible or immiscible with water can be used, such as alcohols, hydrocarbon or aromatic solvents. Preferably the solvent is essentially immiscible with water. Preferably the essentially water-immiscible solvent is carbon tetrachloride, chloroform, cyclohexane, 1,2-dichloroethane, dichloromethane, diethyl ether, dimethyl formamide, ethyl acetate, heptane, hexane, methyl-tert-butyl ether, pentane, toluene, 2,2,4-trimethylpentane. More preferably the solvent is hexane. It is contemplated that the contact may occur in a counter-current fashion.

Figure 1B:
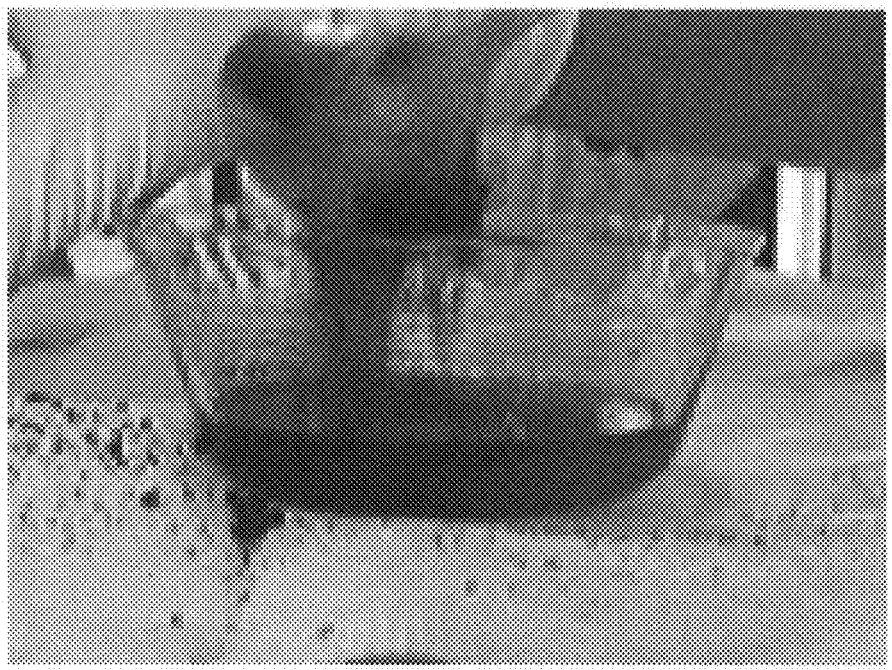
Figure 1C:
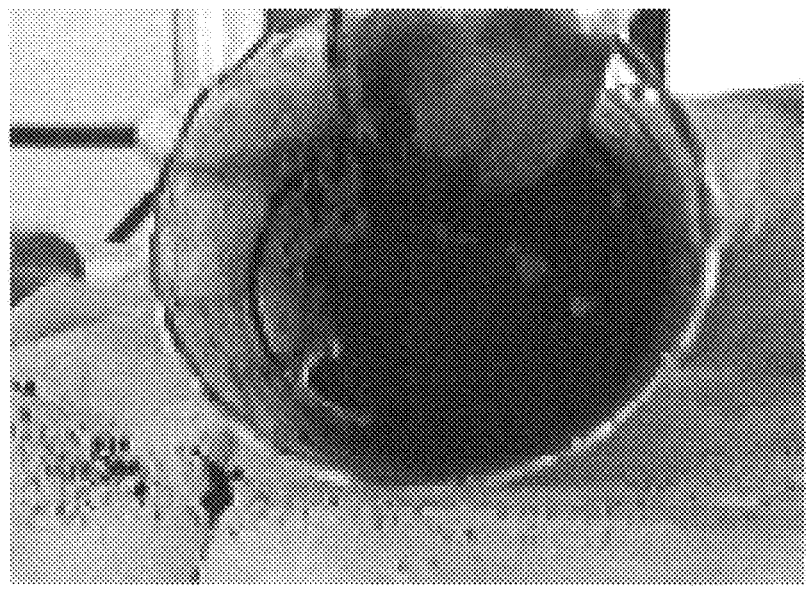
Figure 1D:
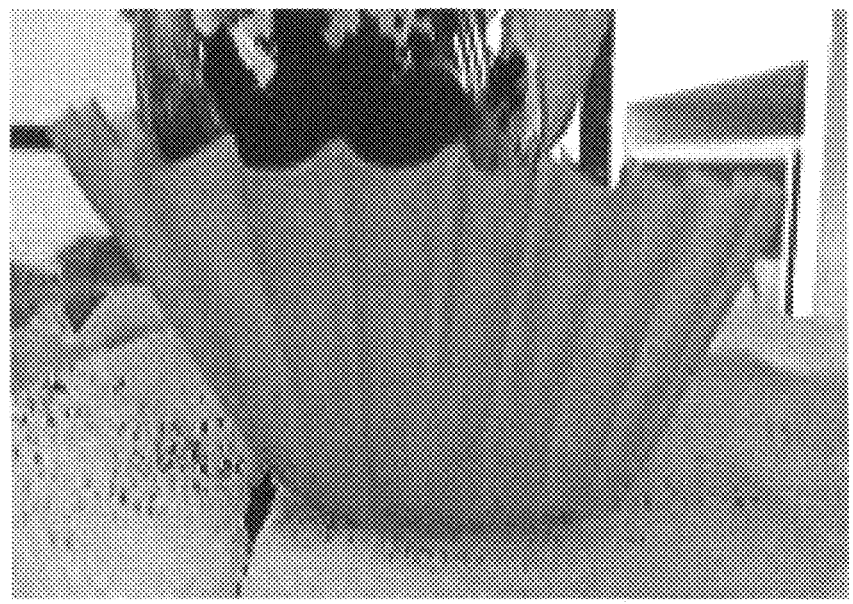
Figure 1E:
Figure 2:
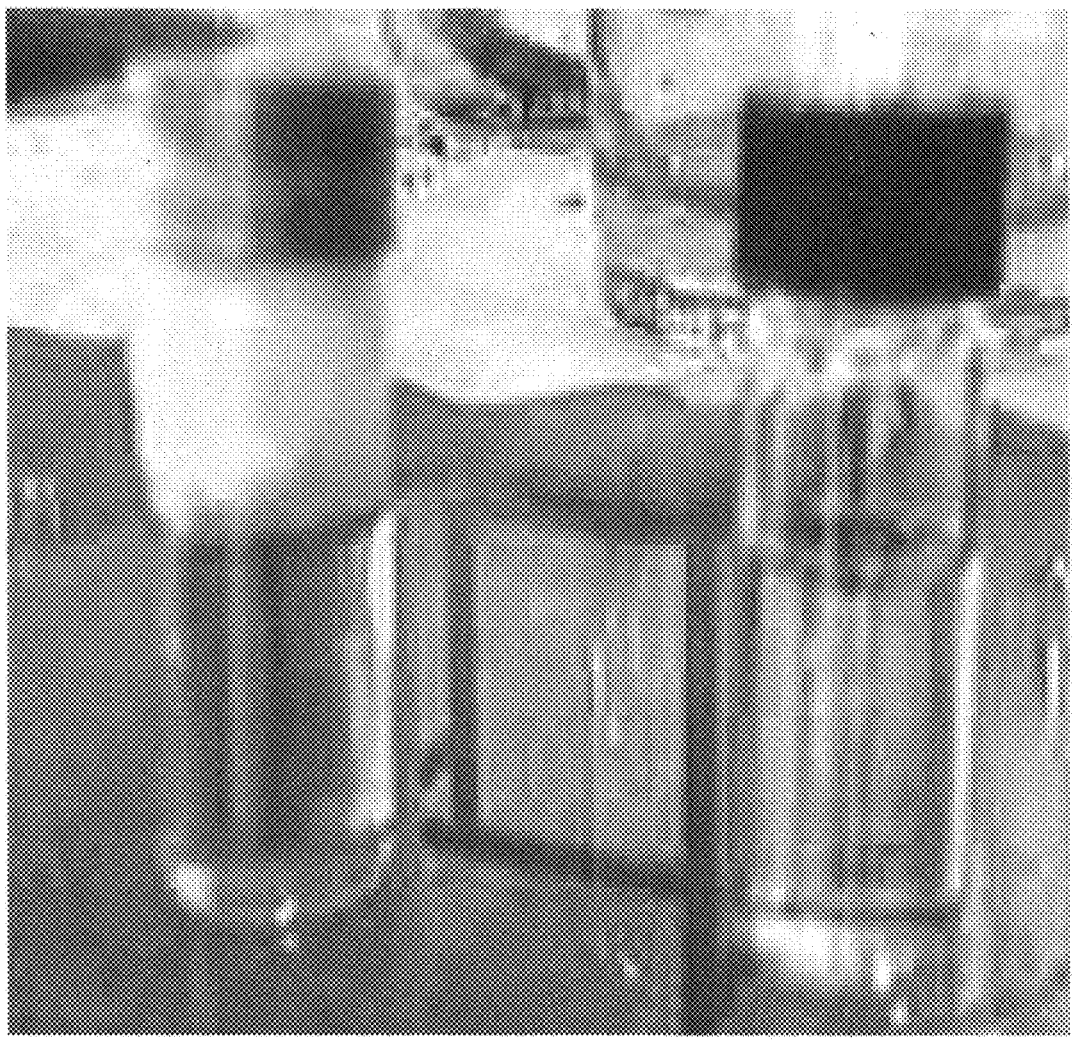
FIG. 2 demonstrates a comparison of the algae biomass/hexane mixture before the addition of graphene (the left tube containing green liquid) and after graphene purification (the right tube containing clear liquid).

The crude extract may be then purified by applying the resultant crude extract to a composition comprising a nanomaterial. This application may include mixing the crude extract with said composition, or by forcing the crude extract through said composition using a pressurized system, wherein the downstream result is a purified oil product substantially free of contaminants. Preferably the crude extract is mixed with the composition comprising a nanomaterial. In this embodiment pressure is applied to recover the oil product, which is substantially free from contaminants. When micro-organisms, such as algae, are used as the starting biomass material, the crude extract will typically have a green color due to contamination with residual pigments as shown in FIG. 1A. FIG. 1A illustrates an algae biomass/hexane mixture, and FIG. 1B shows the algae biomass/hexane mixture with the addition of graphene. FIG. 1C demonstrates the graphene that adsorbed the algae biomass/hexane mixture, after addition, and FIG. 1D illustrates the filtration of the graphene. The purified oil product, which is optically clear and substantially free of contaminating pigments is shown in FIG. 1E. FIG. 2 demonstrates a comparison of the algae biomass/hexane mixture before the addition of graphene (the left tube containing green liquid) and after graphene purification (the right tube containing clear liquid). After contact with the composition comprising a nanomaterial, the resultant oil product will be optically clear to the naked eye as shown in FIG. 1E and FIG. 2, indicating that the oil product is substantially free from pigment contaminants. Herein, substantially free of contaminants means that the concentration of contaminants in the purified oil product is at least 2 times lower than that of the original non-purified oil. Typically, the present invention can be used to produce a purified oil product with a concentration of contaminants at least about 3, 4, 5, 6, 7, 8, 9, 10, 50, 75 or 100 times lower than that of the original non-purified oil. Preferably the purified oil product has a concentration of contaminants at least 10 times lower than that of the original non-purified oil. The contaminants from the initial biomass that can be adsorbed and removed from the purified oil product include optionally substituted hydrocarbons (e.g., linear, branched cyclic, or polycyclic), wherein suitable substituents include halogens, alkyls, nitrogen containing groups (e.g., secondary or tertiary amines, amides, imides), oxygen-containing groups (e.g., ether, alcohol, aldehyde, acid, ester), and sulfur-containing groups (e.g., thiols, thioesters, disulfides, etc.). Such hydrocarbons may be saturated, contain one or more double bonds, and/or may be aromatic. Additionally contemplated contaminant or other compound include metals (and especially mercury), organic and inorganic acids, oil-based paint, and volatile organic compounds (VOC) having a boiling point at or below room temperature (about 20.degree. C.). In particular contaminants such as plant pigments can be removed, including b-carotene, astaxanthin, zeaxanthin, any other molecule classified as carotenoid or chlorophyll, or any other pigment produced by plants.

The processes of the invention can be practiced with any organism that accumulates lipids, such as triglycerides within their cells. The organism may be a multi-cellular plant or animal, including terrestrial and aquatic plants, cattle, pigs, chickens or other mammals that accumulate lipids. Further, the organism may include fungi, such as yeast, or a microorganisms such as bacteria or unicellular algae. Preferably the organism is an algae, such as *Dunaliella Bardawil, Dunaliella salina* or *Dunaliella primolecta, Chlorella vulgaris, Chlorella emorsonii, Chlorella minutissima, Chlorella sorokiniana, Spirulina platensis, Cyclotella cryptica, Tetraselmis suecica, Monoraphidium, Botryococcus braunii, Stichococcus, Haematococcus pluvialis, Phaeodactylum tricomutum, Tetraselmis suecica, Isochrysis galbana, Nannochloropsis, Nitzschia closterium, Phaeodactylum tricornutum, Chlamydomas perigranulata* or *Synechocystis*. More preferably the algae is *Dunaliella salina*. The present process can be used to process extracts derived from any species of *Dunaliella, Chlorella* or *Spirulina*, as well as any other algae that accumulates lipids. Further, it will be clear to one skilled in the art that the crude extract can be obtained from any organism that naturally accumulates, is bred or genetically engineered to increase lipid accumulation.

It will be clear to one skilled in the art that the present invention is not limited by the organism from which the initial crude extract is obtained. The present invention can be practiced using crude extracts obtained from any animal such as pig fat, beef tallow, chicken fat or any other animal fat. It is contemplated that the invention can be used to recover substantially pure triglycerides from rendered animal fat that is an agricultural byproduct or byproduct of the food service industry. Likewise, plants that accumulate lipids, such as the soy, canola, sunflower, marigold, corn, kelp, rice, wheat, palm, mustard, cotton, or coconut can be used in the present invention. Similarly, crude extracts obtained from any fungi, such as yeast can be used in the present invention. Wild type or genetically modified yeast, such as *Cryptococcus curvatus, Candida* 107, *Saccharomyces paradoxus, Saccharomyces mikatae, Saccharomyces bayanus, Saccharomyces cerevisiae,* any *Cryptococcus, C. neoformans, C. bogoriensis, Yarrowia lipolytica, Apiotrichum curvatum, T. bombicola, T. apicola, T. petrophilum, C. tropicalis, C. lipolytica,* and *Candida albicans* can be used to generate a crude extract to be used in the claimed invention. Further, any bacteria that naturally accumulates or are genetically modified to accumulate lipids may be used in the present invention. Such bacteria, include but are not limited *E. coli, Acinetobacter* sp. any actinomycetes, *Mycobacterium tuberculosis,* any *streptomycetes, Acinetobacter calcoaceticus, P. aeruginosa, Pseudomonas* sp., *R. erythropolis, N. erthopolis, Mycobacterium* sp., *B., U. zeae, U. maydis, B. lichenformis, S. marcescens, P. fluorescens, B. subtilis, B. brevis, B. polmyma, C. lepus, N. erthropolis, T. thiooxidans, D. polymorphis, P. aeruginosa* and *Rhodococcus opacus.*

According to this invention, the organismal biomass is originally in a dry, semi-dry, or aqueous slurry or suspension. There are numerous known methods of obtaining such lipid-containing biomass. For example, U.S. Pat. No. 5,658,767 to Kyle; U.S. Pat. No. 5,407,957 to Kyle et al.; U.S. Pat. No. 5,397,591 to Kyle et al.; U.S. Pat. No. 5,374,657 to Kyle et al.; and U.S. Pat. No. 5,244,921 to Kyle et al. disclose methods of obtaining oil-containing microbial biomass. Additionally, U.S. Pat. No. 4,916,066 to Akimoto; U.S. Pat. No. 5,204,250 to Shinmen et al.; U.S. Pat. No. 5,130,242 to Barclay; and U.S. Pat. No. 5,338,673 to Thepenier also discloses methods of obtaining oil-containing biomass. These and other known methods of obtaining an organismal biomass can be used, or alternatively, other sources of a lipid-containing organismal biomass known in the art may be used. The organismal biomass slurry can be comprised of microorganismal cells, such as algae, yeast or bacteria. Alternatively, the slurry may comprise fungal materials such as mycelia, hyphae, or it may contain other lipid-containing plant materials. The organismal biomass may be obtained from any organism that contains lipids. For microorganisms, such as algae, the organismal biomass can contain multiple individual microorganisms. Organismal biomasses derived from multi-cellular organisms will contain at least one multi-cellular organism. The differences in physical size between multi-cellular organisms and microorganisms do not affect the purity of the final purified oil produced by the present invention.

In another embodiment a multi-cellular plant containing lipids is used as the raw material from which the resulting organismal biomass is derived. In this embodiment the raw multi-cellular plant material may require initial processing, such as physical and/or, chemical and/or enzymatic disruption of the plant's multi-cellular structure. Physical disruption may be accomplished by shredding, grinding, cutting, chipping the raw plant material. Chemical disruption may be accomplished by using any chemical compound or mixture that breaks down intracellular plant structures and/or lyses the cells. Such chemicals may include a variety of acids, (e.g hydrochloric acid, nitric acid, acetic acid), bases (e.g. bleach, ammonia), hypotonic or hypertonic solutions. Enzymatic disruption may be accomplished by using any enzyme or enzyme mixture that breaks down intracellular plant structures and/or lyses the cells. Such enzymes include collagenases, ligninases or any other suitable enzyme. Further it is contemplated that the raw multi-cellular plant material may be subjected to any one of the above described disruption processes, either individually, or in conjunction with one or more of the other processes of disruption. Further, when raw multi-cellular plant material is subjected to more than one process of disruption such processes may occur simultaneously or in a step-wise fashion. At the end of this initial processing a biomass suitable for extraction will have been produced from the raw multi-cellular plant material.

In yet another embodiment an animal containing lipids is used as the raw material from which the resulting organismal biomass is derived. This may occur during the rendering processes associated with the slaughter and preparation of animals for human consumption. During these processes an organismal biomass may be isolated from animal material using any conventional rendering process, for use in the present invention. Alternatively the organismal biomass may be produced by collecting animal byproducts, from the food service industry including, but not limited to tallow, lard, cooking oil, grease or any other animal product which contains lipids at sufficiently high amounts to make it economically feasible to convert them into fuel products.

Generally, the lipid-containing organismal biomass is from raw materials containing significant amounts of moisture. Microorganisms used to produce an organismal biomass are typically produced in a culture broth composed of 0.01%-4% dry solids and 96-99% moisture. The lipid-containing organismal biomass can contain multi-cellular plant sources of lipids: the process of this invention may be used to extract oil from aqueous slurries of ground oilseeds such as soybean, cottonseed, sunflower seed, rape seed, oleaginous vegetable material, cacao beans, peanuts, and the like. However, these materials are normally available as dry products and typically water is added to produce a slurry of these materials. On the other hand, the method of this invention may be particularly suited for oil-containing plant materials that occur in high moisture streams, such as corn germ, avocado, olive, coconut, or other oil-containing fruit seeds (see U.S. Pat. No. 4,938,984; Traitler et al.).

It is generally advantageous to reduce the volume of the biomass slurry before extraction. This can be accomplished by filtering the biomass slurry to remove residual water prior to addition of the solvent. Alternatively, centrifuging can increase the solids content of the biomass slurry. The biomass can be concentrated, for example, using a harvest centrifuge, which typically may be a continuous flow centrifuge or a decanter. Typically, the biomass slurry leaving the centrifuge has solids content of 50% or less. In large scale operations that include pumps it is preferable that the exiting slurry retains enough water to make the slurry pumpable, which is typically a moisture content of 65% or greater. In a typical pumpable biomass slurry, the aqueous content of the slurry is between 70-90%, leaving the slurry at 10-30% solids, depending on the organism, the processing equipment used and the characteristics of the fermentation broth. This biomass slurry can be further concentrated by process such as evaporative drying in order to remove excess water, prior to the addition of a solvent. For biomasses comprised of microorganisms, such as algae, it is preferred that the majority of the residual water be removed prior to the addition of the solvent. More preferably the biomass has less than 15% water by weight. Most preferably the biomass is dry and free of residual water.

The biomass may be then placed in intimate contact with a solvent which is essentially immiscible with water. Suitable solvents include non-polar organic liquids, especially aliphatic hydrocarbons, such as hexane or various petroleum ethers. Other solvents within the contemplation of the invention include esters, ethers, ketones, and nitrated and chlorinated hydrocarbons, preferably the solvents are immiscible with water. In a most preferred embodiment, the solvent is hexane. Mixtures of solvents are not necessarily outside the scope of this invention. Addition of solvents which partition between water and organic solvents to leave a major part of the solvent in the water phase are contemplated in this invention. Thus, mixtures of solvents that include aliphatic or acyl alcohols are included in this invention. Typically the ratio of solvent to water is from 1:1 to 100:1; the ratio of solvent to oil is typically 5:1 to 100:1, preferably 15:1 to 30:1. The biomass/solvent mixture may be mixed and or incubated for a short period of time to insure maximum extraction of the lipids contained within the biomass. The crude extract is then removed from the residual biomass by a method such as filtration and/or centrifugation. The resultant crude extract comprises solvent, lipids, and contaminants. The contaminants from the initial biomass may include pigments such as plant pigments including b-carotene, astaxanthin, zeaxanthin, any other molecule classified as carotenoid or chlorophyll, or any other pigment produced by plants.

In yet another embodiment any contaminants, such as pigments retained by the composition comprising a nanomaterial can be recovered. Among other options, a large proportion (typically >70%) of the contaminant can be removed from the composition comprising a nanomaterial by centrifugal or compressive force, wherein the particular force will at least to some degree the release of the contaminant. For example, crude oil can be separated from a composition comprising a nanomaterial using centrifugal force or any type of mechanical force. Further, chemical methods, such as solvent extraction and regeneration, thermal methods, such as heating, and electromagnetic methods can be used to treat the composition comprising a nanomaterial so as to release or destroy the contaminants and regenerate the nanomaterials. The resulting nanomaterials substantially free of contaminants, such as the pigments, may be re-used for the purification of the oil product.

A variety of nanomaterials may be used in the present invention, including carbonaceous nanomaterials and non-carbonaceous nanomaterials, such as silicon nanomaterials, metal-oxide nanomaterials, ternary oxide nanomaterials, including alkaline earth metal titanates, alkali metal titanates, bismuth ferrites, iron oxide-based nanocomposites, metallofullerenes ABO4-type oxides, as well as miscellaneous classes of ternary metal oxides. Preferably a carbonaceous nanomaterial is used in the present invention. A variety of carbonaceous nanomaterials may be used, including any nanomaterial containing carbon ring structures and with grains that have at least one dimension on the order of nanometers. Preferably the grains are on the order of 1-500 nm. The nanomaterial can be graphene.

Nanomaterials are materials composed, at least in part of nanoparticles possessing grain sizes on the order of a billionth of a meter. Nanomaterials can manifest extremely fascinating and useful properties, which can be exploited for a variety of structural and non-structural applications. All materials are composed of grains, which in turn comprise many atoms. These grains are usually invisible to the naked eye, depending on their size. Conventional materials have grains varying in size anywhere from 100's of microns ($\mu$m) to millimeters (mm). A micron ($\mu$m) is a micrometer or a millionth ($10^{-6}$) of a meter. An average human hair is about 100 $\mu$m in diameter. A nanometer (nm) is even smaller a dimension than a $\mu$m, and is a billionth ($10^{-9}$) of a meter. A nanomaterial has grains on the order of 1-500 nm. The average size of an atom is on the order of 1 to 2 angstroms (Å) in radius. 1 nanometer comprises 10 Å, and hence in one nm, there may be 3-5 atoms, depending on the atomic radii. Nanomaterials may contain varying amounts of nanoparticles, from 0.1% to 100%.

Nanoparticles are microscopic particles whose size is measured in nanometres (nm). A nanoparticle is defined as a particle with at least one dimension less than 500 nm. Nanoparticles include various structures, such as tubes, spheres, cylinders and bowels.

In an embodiment, a carbonaceous nanomaterial can be any substantially carbon material containing six-membered rings that exhibits curving of the graphite planes, generally by including five-membered rings amongst the hexagons formed by the positions of the carbon atoms, and has at least one dimension on the order of nanometers. Examples of carbon nanomaterials include, but are not limited to, (soluble and insoluble) fullerenes, single-walled carbon nanotubes (SWNTs), multiple-walled carbon nanotubes (MWNTs), nanotubules, and nested carbon structures with dimensions on the order of nanometers. Carbon nanomaterials may be produced in soot and, in certain cases, carbon nanomaterials may be isolated from the soot or enriched in the soot. Soot produced during the synthesis of carbon nanomaterials, such as fullerenes, typically contains a mixture of carbon nanomaterials which is a source for further purification or enrichment of carbon nanomaterials or which may itself exhibit desired properties of carbon nanomaterials and be useful as an addition to convey those properties. The term "carbon nanomaterials," when used without limitation, is intended to include soot containing detectable amounts of carbon nanomaterials. For example, the term fullerenic soot is used in the art to refer to soot containing fullerenes. Fullerenic soot is encompassed by the term carbon nanomaterials The term "fullerene" is used generally herein to refer to any closed cage carbon compound containing both six- and five-member carbon rings independent of size and is intended to include the abundant lower molecular weight $C_{60}$ and $C_{70}$ fullerenes, smaller molecular weight fullerenes, including $C_{20}$, $C_{24}$, $C_{26}$, etc. up to $C_{60}$, and higher molecular weight fullerenes $C_{2N}$ where N is 36 or more, including $C_{76}$, $C_{78}$, and $C_{84}$. The term is intended to include solvent extractable fullerenes as that term is understood in the art (generally including the lower molecular weight fullerenes that are soluble in toluene or xylene) and to include higher molecular weight fullerenes that cannot be extracted, including giant fullerenes which can be at least as large as $C_{400}$.

As used herein the term polycyclic aromatic hydrocarbon (PAH) refers generally to aromatic hydrocarbon molecules containing two or more six-membered rings, two or more five-membered rings or a mixture of one or more five- and one or more six-membered rings. For example, PAHs can have one aromatic six-member ring and a saturated or unsaturated six-member or five-member ring (e.g., indene and indane); two aromatic rings (e.g., naphthalenes); and three aromatic rings (e.g., anthracene and phenanthrene). The term PAH excludes fullerenes and other carbon nanomaterials. Typically PAHs are components of combustion soot produced by the combustion of hydrocarbon fuels during the production of fullerenes. The term PAH is intended to encompass all such molecules produced during the formation of combustion soot and is not intended to be limited to specific members of the general class of molecules.

Samples containing carbon nanomaterials, including fullerenes and PAHs can be obtained in general from any synthetic method that produces carbon nanomaterials, including plasma synthesis, laser synthesis (e.g., laser ablation methods), pyrolysis, combustion or arc methods. The presence and amount of PAHs in a given sample will depend upon the synthetic method employed and the type of starting material or fuel employed. The methods of this invention are particularly useful in the purification of combustion soot, or dried extracts of combustion soot. As used herein the term "combustion soot" generally refers to a material comprised of the products collected from the burning of hydrocarbon carbon fuels. Combustion soot may contain carbon nanomaterials generally, fullerenes specifically, PAHs, other hydrocarbons, and other impurities. The separation process of the invention is especially useful when the combustion soot is produced from hydrocarbon fuels which comprise one or more aromatic fuels that contain two or more rings, one or more of which is an aromatic ring, including those fuels having two or more rings, only one of which is aromatic, and those having two or more aromatic rings in combination with one or more rings that are not aromatic. The hydrocarbon fuels used in combustion processes for which the present methods are particularly useful may comprise a substantial amount (i.e., about 30% or more by weight) of one or more aromatic molecules having two or more six-member rings, two or more five-member rings or a mixture of one or more six-member rings and one or more five-member rings.

In one preferred aspect of the inventive subject matter, the nanomaterial effectively binds (typically in a non-covalent manner) numerous contaminants, and especially various hydrocarbons (such as pigments), metals, acids, and bases from the crude extract. Among various other nanomaterials, selected carbonaceous materials, and particularly graphene exhibit superior binding characteristics for various hydrocarbons, metals, acids, and bases. Non-porous surfaces of carbonaceous materials with generally flat configuration (e.g., materials in which the first and second dimensions are substantially larger [e.g., at least 1000-fold] than the third dimension) are particularly effective, and have in most cases a smallest dimension of less than 500 nm, and more typically of less than 300 nm, even more typically of less than 200 nm, and most typically of less than 100 nm.

Thus, the invention may be practiced with compositions comprising at least 10% by weight of a carbonaceous material in which the smallest dimension is less than 500 nm (in which preferably at least 50% of the material is a material other than a carbon nanotube), and in which a contaminant is bound to the carbonaceous material in an amount of at least the weight of the carbonaceous material. Further contemplated compositions comprise at least 10% by weight of graphene to which a contaminant is bound in an amount of at least 50% of the weight of the graphene.

With respect to the contemplated materials, it is generally preferred that the nanomaterial is a carbonaceous material fabricated from commercially available starting materials, including coal, tar, coke, graphite, carbonized organic matter, and/or carbonized synthetic fibers. Furthermore, suitable materials also include synthetic compounds, and especially synthetic (preferably polycyclic) aromatic compounds. Contemplated materials may also be derivatized with one or more heteroatoms (e.g., optionally substituted nitrogen, oxygen, sulfur, etc.) and/or substituents. The term "substituted" as used herein also refers to a replacement of a chemical group or substituent (e.g., hydrogen) with a functional group, and particularly contemplated functional groups include nucleophilic (e.g., —$NH_2$, —OH, —SH, —NC, etc.) and electrophilic groups (e.g., C(O)OR, C(X)OH, etc.), polar groups (e.g., —OH), non-polar groups (e.g., aryl, alkyl, alkenyl, alkynyl, etc.), ionic groups (e.g., —$NH_3^+$), halogens (e.g., —F, —Cl), and all chemically reasonable combinations thereof. Thus, the term "substituent" includes nucleophilic (e.g., —$NH_2$, —OH, —SH, —NC, etc.) and electrophilic groups (e.g., C(O)OR, C(X)OH, etc.), polar groups (e.g., —OH), non-polar groups (e.g., aryl, alkyl, alkenyl, alkynyl, etc.), ionic groups (e.g., —NH$_3^+$), halogens (e.g., —F, —Cl), and all chemically reasonable combinations thereof.

Preferably the starting materials are used to produce a nanomaterial with a smallest dimension of less than 500 nm, more typically of less than 300 nm, even more typically of less than 200 nm, and most typically of less than 100 nm. In most preferred aspects, such reagents were used to produce graphene from the appropriate starting material (typically graphite). There are numerous carbon-carbon bond cleavage reagents known in the art, and all of them are considered suitable for use herein. However, particularly preferred reagents include commercially available activated acid catalysts (e.g., Catalog Item: Activated Acid Catalyst #3 (plasma-activated hydrochloric acid) by SupraCarbonic, LLC., 348 N. Eckhoff Street—Orange, Calif. 92868, USA; www.supracarbonic.com/products/).

Depending on the starting material and conditions of manufacture, suitable compositions for the removal of contaminants from the crude extract may comprise between 0.1% by volume and 99.9% by volume of nanomaterial. It is preferred that the nanomaterial comprises graphene. Typically, the nanomaterial is present in an amount of at least 10 to 30%, more preferably at least 50%, even more preferably at least 70%, and most preferably at least 90%. However, compositions which can be used in the instant invention can also include single- and multi-walled carbon nanotubes, carbon nanohoms, and/or carbon nanoonions. Where such other nanostructures are present, it is preferred that the single- and multi-walled carbon nanotubes, carbon nanohoms, and/or carbon nanoonions are present in an amount of less than 50%, more preferably less than 30% and most preferably less than 10%. Most preferably at least 50% of the carbonaceous nanomaterial is a material other than a carbon nanotube.

In an embodiment, the composition comprising a nanomaterial can be used to selectively remove contaminants from the crude extract. The nanomaterial can be selected according to the contaminant to be removed. For example, carotenoids may have commercial value and can be selectively separated from chlorophylls. In another example, the chlorophyll may be the contaminant of interest. In this way, the invention provides a process for selectively extraction of materials from an organismal biomass or a crude extract from an organismal biomass.

Products such as ionones, damascones, and damascenones that can be generated from the degradation or use of carotenoids include, but are not limited to, fragrance chemicals that are used extensively in the perfumes and fragrance industry. For example, the floral smells present in items such as black tea, aged tobacco, grapes, and many fruits are due to the aromatics compounds resulting from carotenoid breakdown.

According to the present invention, the carbonaceous material may be an activated carbon particle, such as activated charcoal, used alone or in conjunction with a nanomaterial to effectively remove substantially all of the contaminants, or selectively recovering a particular ingredient from the biomass. For example, the activated charcoal can provide a large surface area for contacting the composition comprising a nanomaterial to contaminants in a crude extract from an organismal biomass. The activated carbon can be in a pelleted, granulated, or powdered form or coated onto a surface on an object.

It is contemplated that embodiments employing mechanical force include a separator that is in contact with the composition comprising a nanomaterial to which a quantity of contaminant is adsorbed, wherein the separator is configured to deliver a mechanical force to the composition comprising a nanomaterial at a strength effective to remove at least 20%, more typically at least 50%, even more typically at least 70%, and most typically at least 90% of the quantity of the contaminant.

Most typically, the mechanical force in contemplated separators is a centrifugal and/or compressive force that is applied to the composition comprising a nanomaterial to which the contaminant is adsorbed. For example, suitable separators may include one or more pairs of rollers that receive and compress the non-porous carbonaceous material to thereby expel the adsorbed compound. Such configurations are particularly advantageous where the composition comprising a nanomaterial remains enclosed in a container from which the adsorbed material can be removed. Alternatively, compressive forces may also be provided by two or more corresponding elements that receive and compress the composition comprising a nanomaterial to which the contaminant or other material is adsorbed. In still further exemplary configurations, compressive forces may be realized by pushing the composition comprising a nanomaterial against one or more sieves or other structure that largely retain the non-porous carbonaceous material while allowing the previously adsorbed material to pass through. Compressive forces will typically be in the range of about 0.1 psi to about 10,000 psi, and most typically between 10 psi to about 1000 psi. Similarly, where centrifugal force is applied, forces will typically be in the range of 10-50,000×g, and more typically between 50-5,000×g.

Similarly, centrifugal forces may be provided by placing the composition comprising a nanomaterial in a rotating drum or cylinder from which the adsorbed material can be drained (e.g., through openings in the cylinder wall) or otherwise removed. Typically, higher rotational speed will increase the degree of removal of the adsorbed material from the non-porous carbonaceous material. Depending on the particular configuration, it should be recognized that the composition comprising a nanomaterial can be fed in a continuous manner (e.g., using a vortex-based separator or flow-through-type centrifuge) to allow continuous regeneration of the composition comprising a nanomaterial. Of course, it should be recognized that compressive forces and centrifugal forces may be combined in a regeneration device. For example, a contaminant may first be removed from the composition comprising a nanomaterial in a roller press while disposed within a container, such as a boom, pillow, or envelope. In a subsequent step, residual contaminant is then removed from the composition comprising a nanomaterial via centrifugation, wherein the composition comprising a nanomaterial material may be removed from the container.

Alternatively, and especially where the contaminant is ecologically problematic, a health hazard or is especially problematic to downstream applications such as conversion to a fuel oil and use in a conventional engine or furnace, it is contemplated that the separator may also be configured to deliver at least one of a thermal and an electromagnetic energy to the carbonaceous material in an amount effective to remove and/or destroy at least 20%, more typically at least 50%, even more typically at least 70%, and most typically at least 90% of the quantity of the contaminant. Most typically, where the contaminant is destroyed in situ (e.g., while adsorbed to, or in close proximity [e.g., within 1 mm] of a composition comprising a nanomaterial) using microwave irradiation, the weight ratio of contaminant to the composition comprising a nanomaterial is equal or less than 10:1, more typically less than 5:1, and most typically less than 1:1. However, higher ratios are not necessarily excluded.

Consequently, suitable regenerators will include one or more magnetrons, wherein the microwave energy and frequency from the magnetron(s) is preferably selected such that the composition comprising a nanomaterial emits electrons at an energy effective to at least partially destroy the contaminant. For example, suitable frequencies include those between 1.0-4.5 GHz, and most preferably 2.45 GHz, while preferred energies will typically fall within the range of several hundred to several thousand (and even several ten thousand) Watt. With respect to the irradiated material, it should be recognized that composition comprising nanomaterials such as carbonaceous nanomaterials are a relatively good microwave susceptor. Therefore, and depending on the time and energy of microwave irradiation, a composition comprising a carbonaceous nanomaterial will readily reach a temperature of between about 400° C. to about 2500° C., and even higher. Alternatively, or additionally, contemplated regenerators may also include a direct (e.g., flame, heat filament, etc.) or indirect heater (e.g., radiator, hot air blower, etc.) that assists in reparation of the adsorbed contaminant from the composition comprising a nanomaterial.

It is further preferred that the container in which the composition comprising a nanomaterial is irradiated is preferably hermetically sealed while the material is irradiated. Most typically, the container comprises a refractory material, and most preferably a ceramic inner wall. Irradiation products formed from the previously adsorbed materials are typically oxidized small molecules, including $CO_2$, and $Cl_2$, which can be vented to a suitable receiving portion (e.g., solvent trap, filter, etc.). Irradiation times will typically depend on the particular contaminant and quantity adsorbed, and it should be recognized that a person of ordinary skill in the art will readily be able to identify proper times. Where microwave energy is employed to desorb the adsorbed contaminant without significant destruction by ballistic electron emission, it is contemplated that the microwave energy is significantly reduced to effect predominantly inductive heating in the composition comprising a nanomaterial. For example, the composition comprising a nanomaterial can be irradiated with 200 W of microwave energy at 2.45 GHz for several seconds per 10 g to raise the temperature to several hundred degrees ° C.

The invention is illustrated by the following examples.

Example 1

*Dunaliella salina* algae in an aqueous saline solution at an initial concentration of 1 g/l on a dry basis was harvested using centrifugation. The resulting aqua-algae solution, containing about 30% algal mass, was dried by exposure to sunlight for 10 hours to remove all moisture. The dried algal mass was contacted with hexane in a ratio of 20:1, hexane to algal mass (FIG. 1A). After approximately 1 min, the lipophillic phase was extracted in the hexane, as confirmed by the deep green pigmentation of hexane after contacting the biomass.

The resulting crude algal extract consisted of a hexane/lipid phase, which also contained dissolved pigments (chlorophyll molecules), beta-carotene and triglycerides. The crude extract was separated from the residual biomass via filtration with a Millex GV 0.22 micron filter unit attached to a 30 ml Luer-Lok (TM Beckton Dickinson) plastic syringe.

The filtered hexane/lipid phase was contacted with graphene in a ratio of 10 milligrams of graphene per ml of solution (FIG. 1B). After 5 seconds of contacting time, the hexane/lipid phase was adsorbed by the graphene (FIGS. 1C and 1D). The graphene was centrifuged and a clear liquid oil product was released (FIG. 1E). This clear liquid phase consisted in a lipid-rich hexane solution lacking residual plant pigments, and was confirmed by the clear change in color. The remaining hexane was successively removed using evaporation assisted by low level heat. The final purified oil phase was substantially free of both solvent and residual plant pigments (FIG. 2).

Example 2

Example 1 demonstrates graphene can be used to clarify chlorophyll-containing hexane which was used to extract dried algal biomass. The aforementioned hexane extract is usually dark green, as it contains many pigments (in addition to fatty acids, triglycerides and other lipids) from the cells. In this example, it is demonstrated that an embodiment of the nanomaterial, graphene, has a relatively high specificity (compared to activated charcoal) for sequestering chlorophyll as compared to carotenoids. Thus, graphene could be used in refining algae oil to remove chlorophyll contaminants but to leave behind valuable carotenoids in the hexane extract which could then be isolated and sold for commercial purposes.

Figure 3:
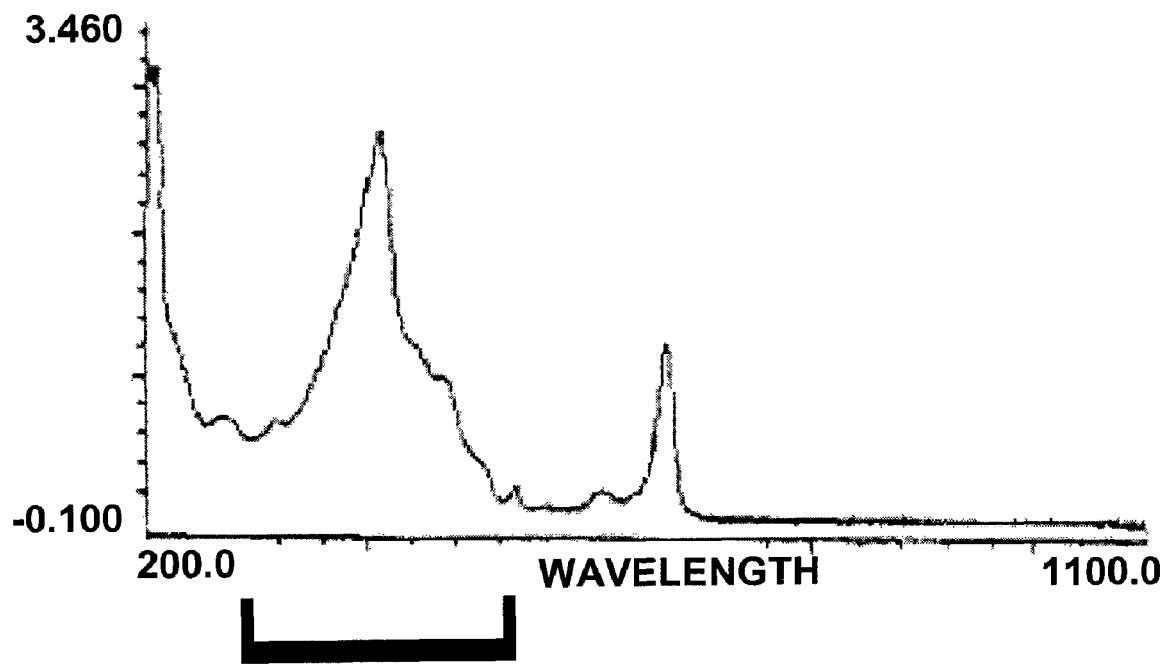
FIG. 3 illustrates measurement of green hexane extract from green algal biomass by a spectrophotometer, and includes peaks corresponding to chlorophylls and carotenoids.

Briefly, 2 grams of dried green algal biomass were crushed using a pestle and extracted with 60 ml of pure hexane. The green hexane extract was diluted 1:10 in pure hexane and spectral analysis (from 200 nm to 100 nm) was performed on a ThermoFisher spectrophotometer as shown in FIG. 3. The chlorophyll peaks can be seen at around 400 nm and 630 nm. The chlorophyll that absorbs in the 400 nm area obfuscates the presence of the characteristic 3-shouldered carotenoid absorbance spectra.

Figure 4:
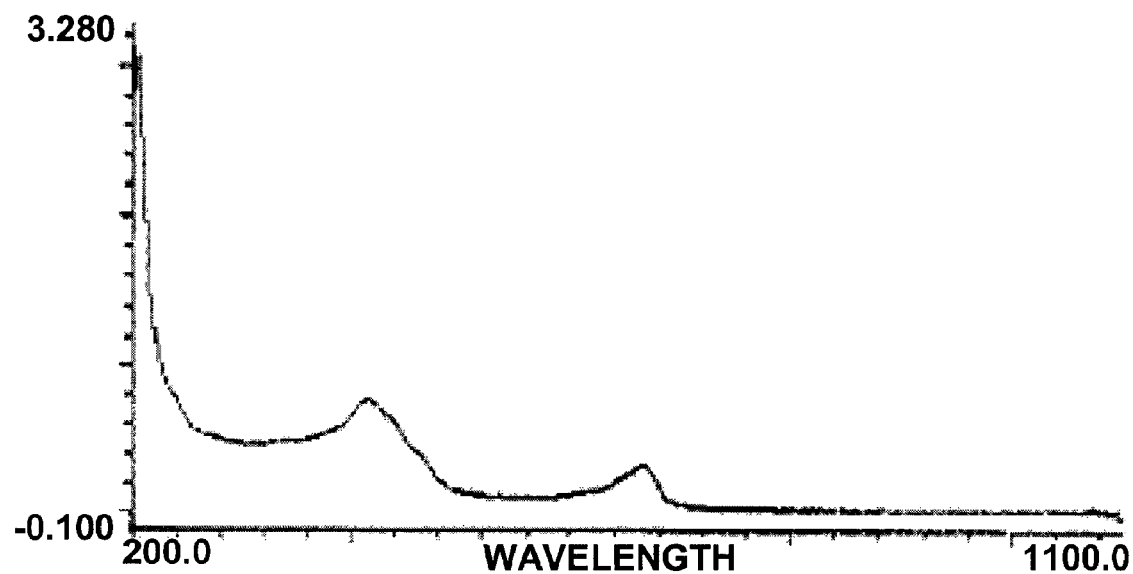
FIG. 4 illustrates the effect of adding activated charcoal to the green hexane extract by a measurement with a spectrophotometer.

Activated charcoal (50-200 mesh from Sigma Aldrich) was added 0.5 g at a time to 10 ml of hexane extract until no green tint was detectable by eye in the previously green hexane extract. After 2 g charcoal was added, some green tint was visible, and this partially clarified extract was analyzed spectrophotometrically as before as shown in FIG. 4. The chlorophyll peaks are going away (as the chlorophyll is being absorbed by the charcoal); however, the carotenoids are being absorbed, also, as the 3-shouldered spectra is not becoming apparent. After 2.5 grams of charcoal treatment, most of the pigments (chlorophyll and carotenoids) have been absorbed as shown in FIG. 5.

A similar experiment was performed with graphene, only the graphene was added 50 mg at a time to 10 ml of extract. After 100 mg graphene was added, some slight greenish tint was visible, and this partially clarified extract was analyzed in FIG. 6.

Figure 5:
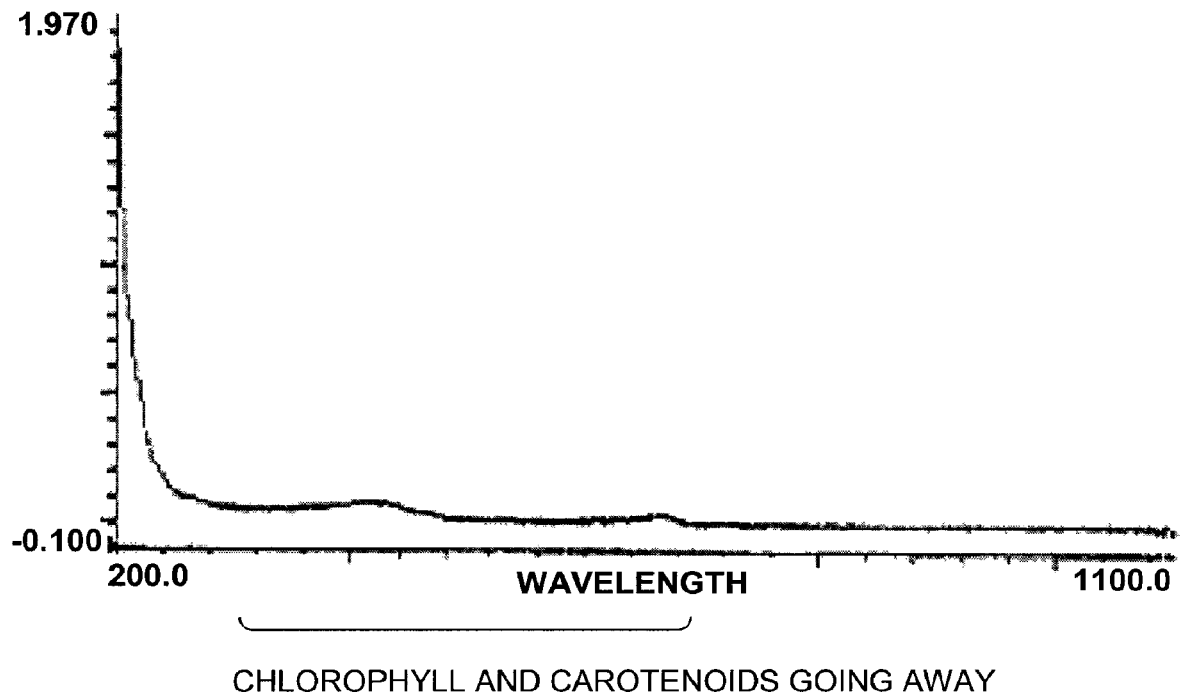
FIG. 5 illustrates the effect of adding graphene to the green hexane extract by a measurement with a spectrophotometer.
Figure 6:
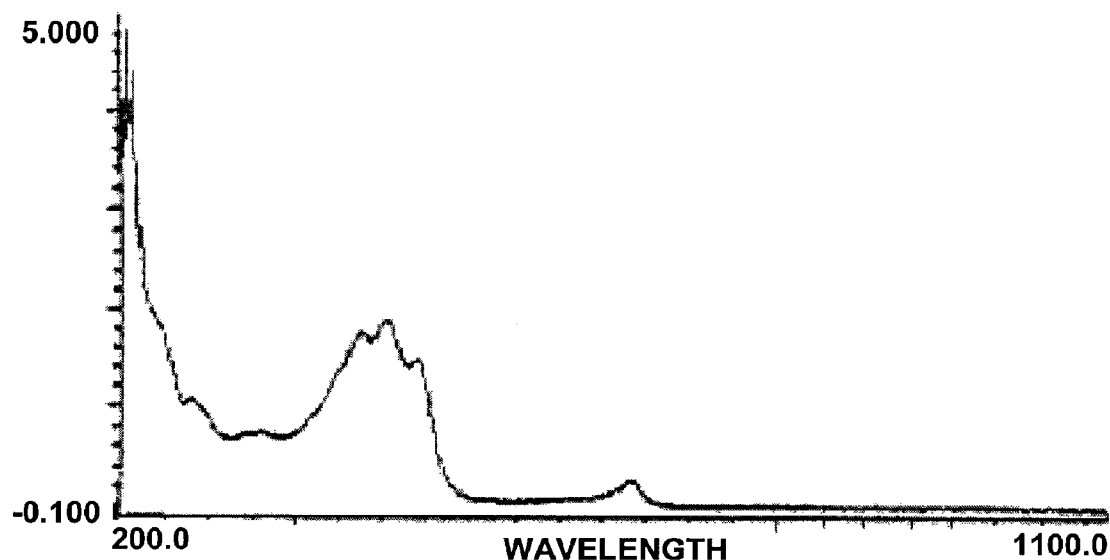
FIG. 6 demonstrates the specificity of graphene for chlorophyll over carotenoids by a measurement with a spectrophotometer.
Figure 7:
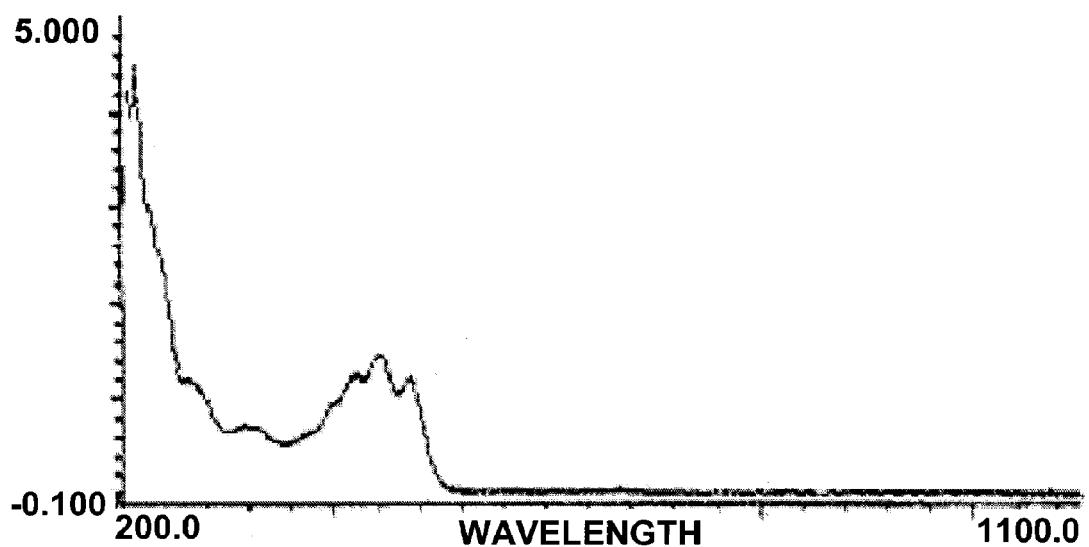
FIG. 7 illustrates spectrophotometric analysis of a crude extract after a majority of chlorophyll has been removed.

Comparing FIG. 6 to FIG. 5, it is seen that graphene, and not charcoal, has some specificity for chlorophyll over carotenoids, as the characteristic carotenoid shoulders are becoming apparent between 400 nm and 440 nm. After 150 total mg graphene were added, the extract appeared yellowish (as the green chlorophyll molecules were being removed but the carotenoids were being left behind). Spectrophotometric analysis revealed that the majority of chlorophyll had been removed, but the carotenoids remained as illustrated in FIG. 7.

These simple experiments demonstrate the utility of graphene for not only removing chlorophyll from hexane extract of algal biomass for biofuel production, but also for separating valuable carotenoids from contaminating chlorophyll. The carotenoids could be recovered by various methods (including distillation) and utilized for commercial purposes.

Numerous modifications and variations in the invention as set forth in the above illustrative examples are expected to occur to those skilled in the art. Consequently only such limitations as appear in the appended claims should be placed on the invention.

What is claimed is:

1. A process for recovering an oil product from an organism, comprising: (a) obtaining a crude extract from an organismal biomass; (b) applying said crude extract to a composition comprising a nanomaterial; and (c) recovering said oil product from said composition comprising the nanomaterial.

2. The process of claim 1, wherein said organism is grown prior to step (a).

3. The process of claim 1, wherein the crude extract is obtained in step (a) by exposing the organismal biomass to at least one water-immiscible solvent.

4. The process of claim 3, wherein the water-immiscible solvent is selected from the group consisting of carbon tetrachloride, chloroform, cyclohexane, 1,2-dichloroethane, dichloromethane, diethyl ether, dimethyl formamide, ethyl acetate, heptane, hexane, methyl-tert-butyl ether, pentane, toluene, 2,2,4-trimethylpentane.

5. The process of claim 1, further comprising step (d) wherein said oil product produced in step (c) is exposed to a treatment to remove said at least one solvent.

6. The process of claim 5, wherein said treatment comprises evaporation at a low temperature.

7. The process of claim 2, wherein said organism is an algae.

8. The process of claim 7, wherein said algae is a species of *Dunaliella*, *Chlorella* or *Spirulina*.

9. The process of claim 8, wherein said algae is *Dunaliella Bardawil*, *Dunaliella sauna* or *Dunaliella primolecta*, *Chlorella vulgaris*, *Chlorella emorsonii*, *Chlorella minutissima*, *Chlorella sorokiniana*, *Chlorella vulgaris* or *Spirulina platensis*.

10. The process of claim 7, wherein said algae is *Cyclotella cryptica*, *Tetraselmis suecica*, *Monoraphidium*, *Botryococcus braunii*, *Stichococcus*, *Haematococcus pluvialis*, *Phaeodactylum tricornutum*, *Tetraselmis suecica*, *Isochrysis galbana*, *Nannochloropsis*, *Nitzschia closterium*, *Phaeodactylum tricornutum*, *Chlamydomas perigranulata* or *Synechocystis*.

11. The process of claim 1, wherein said nanomaterial is a carbonaceous nanomaterial.

12. The process of claim 1, wherein recovery step (c) comprises applying pressure to said composition in order to recover said oil product.

13. The process of claim 12 is subjected to centrifugation or mechanical compression in order to obtain said oil product.

14. The process of claim 1, wherein said composition comprises at least 10% by weight of carbonaceous nanomaterials.

15. The process of claim 1, wherein said nanomaterial comprises carbonaceous nanoparticles, wherein the smallest dimension of said carbonaceous nanoparticles is less than 500 nm n.

16. The process of claim 15, wherein at least 50% of the nanoparticles are a material other than a carbon nanotube.

17. The process of claim 15, wherein said nanomaterial has the capacity to bind an amount of contaminant equal to at least 50% of the weight of said nanomaterial.

18. The process of claim 15, wherein at least 50% of said carbonaceous particles have the smallest dimension less than 500 nm.

19. The process of claim 15, wherein at least 50% of said carbonaceous particles have the smallest dimension less than 300 nm.

20. The process of claim 15, wherein at least 50% of said carbonaceous particles have the smallest dimension less than 200 nm.

21. The process of claim 15, wherein at least 50% of said carbonaceous particles have the smallest dimension less than 100 nm.

22. The process of claim 15, wherein said nanomaterial has the capacity to bind an amount of contaminant equal to at least 10 times the weight of said nanomaterial.

23. The process of claim 15, wherein a portion of the carbonaceous material has a tubular or spheroid configuration.

24. The process of claim 1, wherein said nanomaterial comprises graphene.

25. The process of claim 24, wherein nanomaterial comprises at least 10%, 30%, 50%, 70%, 90%, or 99.9% graphene by weight.

26. A composition produced by the process of claim 6 comprising purified oil that is substantially free of any solvents or pigments.

27. The composition of claim 26, wherein said composition has less than 15% water by weight.

28. The composition of claim 26, wherein the organism from which the purified oil was produced is an algae.

* * * * *